US009898999B2

(12) United States Patent
Bae et al.

(10) Patent No.: US 9,898,999 B2
(45) Date of Patent: Feb. 20, 2018

(54) DISPLAY DRIVER IC, APPARATUS INCLUDING THE SAME, AND METHOD OF OPERATING THE SAME

(71) Applicant: Samsung Electronics Co., Ltd., Suwon-si, Gyeonggi-do (KR)

(72) Inventors: Jong Kon Bae, Seoul (KR); Won Sik Kang, Seoul (KR); Yang Hyo Kim, Suwon-si (KR); Jae Hyuck Woo, Osan-si (KR)

(73) Assignee: SAMSUNG ELECTRONICS CO., LTD., Yeongtong-gu, Suwon-si, Gyeonggi-do (KR)

( * ) Notice: Subject to any disclaimer, the term of this patent is extended or adjusted under 35 U.S.C. 154(b) by 537 days.

(21) Appl. No.: 14/321,923

(22) Filed: Jul. 2, 2014

(65) Prior Publication Data

US 2015/0029233 A1 Jan. 29, 2015

(30) Foreign Application Priority Data

Jul. 25, 2013 (KR) ........................ 10-2013-0088192

(51) Int. Cl.

| | |
|---|---|
| ***G06F 1/00*** | (2006.01) |
| ***G09G 5/04*** | (2006.01) |
| ***G09G 5/36*** | (2006.01) |
| *G09G 3/34* | (2006.01) |

(52) U.S. Cl.

CPC ............... *G09G 5/04* (2013.01); *G09G 5/363* (2013.01); *G09G 3/3406* (2013.01); *G09G 2320/062* (2013.01); *G09G 2330/023* (2013.01); *G09G 2360/06* (2013.01); *G09G 2360/08* (2013.01); *G09G 2370/08* (2013.01)

(58) Field of Classification Search

CPC .. G06K 9/00; G06K 9/34; G09G 1/00; G09G 2330/021; G09G 3/3688

See application file for complete search history.

(56) References Cited

U.S. PATENT DOCUMENTS

| | | | | |
|---|---|---|---|---|
| 7,778,460 B2 * | 8/2010 | Park | H04N 1/6027 | 382/167 |
| 2008/0025602 A1 * | 1/2008 | Won | H04N 1/60 | 382/167 |

FOREIGN PATENT DOCUMENTS

| | | |
|---|---|---|
| JP | 08-254964 | 10/1996 |
| JP | 2004-260603 | 9/2004 |
| JP | 2005-151596 | 6/2005 |
| JP | 2005-534047 | 11/2005 |
| JP | 2008-193263 | 8/2008 |
| JP | 2009-169141 | 7/2009 |
| JP | 2011-205189 | 10/2011 |
| KR | 10-2007-0016430 | 2/2007 |
| KR | 10-2011-0078711 | 7/2011 |
| KR | 10-2012-0036062 | 4/2012 |

* cited by examiner

*Primary Examiner* — Michael Faragalla

(74) *Attorney, Agent, or Firm* — Muir Patent Law, PLLC

(57) ABSTRACT

A method of operating a display driver IC (DDI) includes comparing previous line data with current line data and the R, G, and B components of a color data signals, and controlling whether to activate part of an intermediate processing circuit to process the current line data or more than a single component of the color data signal according to a comparison result.

13 Claims, 15 Drawing Sheets

DISPLAY DRIVER IC, APPARATUS INCLUDING THE SAME, AND METHOD OF OPERATING THE SAME

CROSS-REFERENCE TO RELATED APPLICATIONS

This application claims priority under 35 U.S.C. § 119(a) from Korean Patent Application No. 10-2013-0088192 filed on Jul. 25, 2013, the disclosure of which is hereby incorporated by reference in its entirety.

BACKGROUND

1. Field

Embodiments of the present general inventive concept generally relate to a display driver integrated circuit (IC) (DDI), and more particularly, to a DDI to deactivate part of an intermediate processing circuit when line data is repeated, an apparatus including the same, and a method of operating the same.

2. Description of the Related Art

A DDI is an integrated circuit (IC) that drives a display module implemented as a liquid crystal display (LCD), a light emitting diode (LED), an organic LED (OLED), etc., but is not limited thereto. As an ultra high-resolution display module is used in a smart phone, a DDI that has high performance and low power consumption is desired.

SUMMARY

The present general inventive concept provides a display driver integrated circuit (DDI) to deactivate part of an intermediate processing circuit when line data is repeated or a gray pattern is detected, an apparatus that includes the DDI, and a method of operating the DDI.

Additional features and utilities of the present general inventive concept will be set forth in part in the description which follows and, in part, will be obvious from the description, or may be learned by practice of the general inventive concept.

The foregoing and/or other features and utilities of the present general inventive concept may also be achieved by providing a method of operating a DDI including comparing previous line data with current line data and controlling whether to activate part of an intermediate processing circuit to process the current line data according to a comparison result.

The method may further include processing the previous line data using the intermediate processing circuit and transmitting processed previous line data to a data latch; and outputting the processed previous line data as output data corresponding to the current line data when it is found that the previous line data is the same as the current line data as the comparison result.

The controlling may include deactivating the part of the intermediate processing circuit when it is found that the previous line data is the same as the current line data as the comparison result and activating the part of the intermediate processing circuit when it is found that the previous line data is different from the current line data as the comparison result.

The deactivating the part of the intermediate processing circuit may include gating the current line data transmitted to the intermediate processing circuit.

Alternatively, the deactivating the part of the intermediate processing circuit may include gating a clock signal applied to the intermediate processing circuit.

As an alternative, the deactivating the part of the intermediate processing circuit may include controlling power supply to the intermediate processing circuit.

The part of the intermediate processing circuit may include a pixel data processing circuit, a source shift register controller, and a data shift register.

A pre-processing circuit, which is included in the intermediate processing circuit and generates information to control a back light of a display driven by the DDI, may be activated even when the previous line data is the same as the current line data.

The foregoing and/or other features and utilities of the present general inventive concept may also be achieved by providing a DDI including a storage circuit to store previous line data and current line data, an intermediate processing circuit to process the current line data, and a line data comparing circuit to compare the previous line data with the current line data and to generate a comparison signal to control whether to activate the intermediate processing circuit according to a comparison result.

The storage circuit may be a line buffer circuit that buffers the previous line data and the current line data and outputs the previous line data and the current line data to the line data comparing circuit in an overlapping time period.

The DDI may further include a data latch to store the previous line data that has been processed by the intermediate processing circuit. The data latch may output the processed previous line data as output data corresponding to the current line data when the previous line data is the same as the current line data based on the comparison signal.

The foregoing and/or other features and utilities of the present general inventive concept may also be achieved by providing a display device including a DDI including a DDI including a storage circuit to store previous line data and current line data, an intermediate processing circuit to process the current line data, and a line data comparing circuit to compare the previous line data with the current line data and to generate a comparison signal to control whether to activate the intermediate processing circuit according to a comparison result, and a display panel driven by the DDI.

The foregoing and/or other features and utilities of the present general inventive concept may also be achieved by providing a display system including a DDI including a storage circuit to store previous line data and current line data, an intermediate processing circuit to process the current line data, and a line data comparing circuit to compare the previous line data with the current line data and to generate a comparison signal to control whether to activate the intermediate processing circuit according to a comparison result, and a display panel driven by the DDI, and an application processor to output the previous line data and the current line data to the display device.

The foregoing and/or other features and utilities of the present general inventive concept may also be achieved by providing a method of operating a DDI, the method including comparing color data signals constructing display data with each other and detecting a gray pattern and controlling whether to activate part of an intermediate processing circuit to process the color data signals according to a detection result.

The gray pattern may be a data pattern in which the color data signals are the same as each other.

The method may further include comparing a length of a period in which the gray pattern is detected with a reference length, such that whether to activate the part of the intermediate processing circuit may be controlled when the length of the period in which the gray pattern is detected is longer than the reference length.

The reference length may correspond to a length of a horizontal line of a display panel driven by the DDI.

Only part to process one of the color data signals in the intermediate processing circuit may be activated when the gray pattern is detected as the detection result and the whole of the intermediate processing circuit may be activated when the gray pattern is not detected as the detection result.

When the gray pattern is detected as the detection result, one of the color data signals stored in the line buffer circuit may be read and processed.

The foregoing and/or other features and utilities of the present general inventive concept may also be achieved by providing a DDI including an intermediate processing circuit to process color data signals constructing display data, and a gray pattern detector to compare the color data signals with each other, detect a gray pattern, and generate a comparison signal to control whether to activate part of the intermediate processing circuit according to a detection result.

The intermediate processing circuit may include a gating circuit to gate the color data signals based on the comparison signal.

The intermediate processing circuit may further include a pre-processing circuit to generate information to control a back light of a display driven by the DDI. At this time, the gating circuit may not gate the color data signals input to the pre-processing circuit.

The intermediate processing circuit may further include a source shift register controller to control data shifting of the color data signals. The source shift register controller may activate only the internal circuit that is associated with one of the color data signals according to the comparison signal.

The foregoing and/or other features and utilities of the present general inventive concept may also be achieved by providing a display device including a DDI including an intermediate processing circuit to process color data signals constructing display data, and a gray pattern detector to compare the color data signals with each other, detect a gray pattern, and generate a comparison signal to control whether to activate part of the intermediate processing circuit according to a detection result, and a display panel driven by the DDI.

The foregoing and/or other features and utilities of the present general inventive concept may also be achieved by providing a display system including a DDI including an intermediate processing circuit to process color data signals constructing display data, a gray pattern detector to compare the color data signals with each other, detect a gray pattern, and generate a comparison signal to control whether to activate part of the intermediate processing circuit according to a detection result, and a display panel driven by the DDI, and an application processor to output the color data signals to the display device.

The foregoing and/or other features and utilities of the present general inventive concept may also be achieved by providing a display system, including a display driver IC (DDI), comprising a gray pattern detector to compare output color data signals, detect whether a gray pattern exists, and activate output lines according to the detection result, and an application processor to output the color data signals via the activated output lines to a display device.

Only one of the output lines may be activated when the gray pattern is detected, and all of the output lines may be activated when the gray pattern is not detected.

The output lines may correspond to red, blue, and green lines, respectively, and the color data signals may be red, blue, and green read data signals corresponding to the output lines, respectively.

BRIEF DESCRIPTION OF THE DRAWINGS

These and/or other features and utilities of the present general inventive concept will become apparent and more readily appreciated from the following description of the embodiments, taken in conjunction with the accompanying drawings of which

DETAILED DESCRIPTION OF THE PREFERRED EMBODIMENTS

Figure 1:
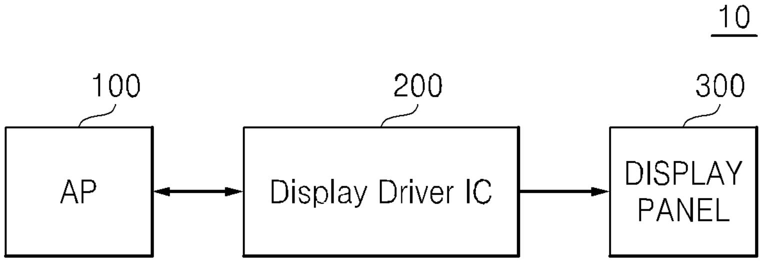
FIG. 1 is a block diagram illustrating a display system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The present general inventive concept now will be described more fully hereinafter with reference to the accompanying drawings, in which embodiments of the present general inventive concept are shown. This present general inventive concept may, however, be embodied in many different forms and should not be construed as limited to the embodiments set forth herein. Rather, these embodiments are provided so that this disclosure will be thorough and complete, and will fully convey the scope of the present general inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the present general inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this present general inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram illustrating a display system 10 according to an exemplary embodiment of the present general inventive concept. Referring to FIG. 1, the display system 10 may include an application processor (AP) 100, a display driver integrated circuit (DDI) 200, and a display panel 300.

According to some embodiments of the present general inventive concept, the display system 10 may be implemented as a portable device such as a mobile telephone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a wearable computer, or an e-book.

The AP 100 may control the overall operation of the display system 10. The AP 100 may be implemented as an integrated circuit (IC), a system on chip (SoC) or a mobile AP. The AP 100 may transmit display data (e.g., image data) to be displayed to the DDI 200.

The DDI 200 may process the display data received from the AP 100 and transmit processed display data to the display panel 300. The display panel 300 may display the display data received from the DDI 200. The display panel 300 may be implemented as a thin film transistor liquid crystal display (TFT-LCD) panel, a light emitting diode (LED) display panel, an organic LED (OLED) display panel, or an active matrix OLED display panel.

Figure 2:
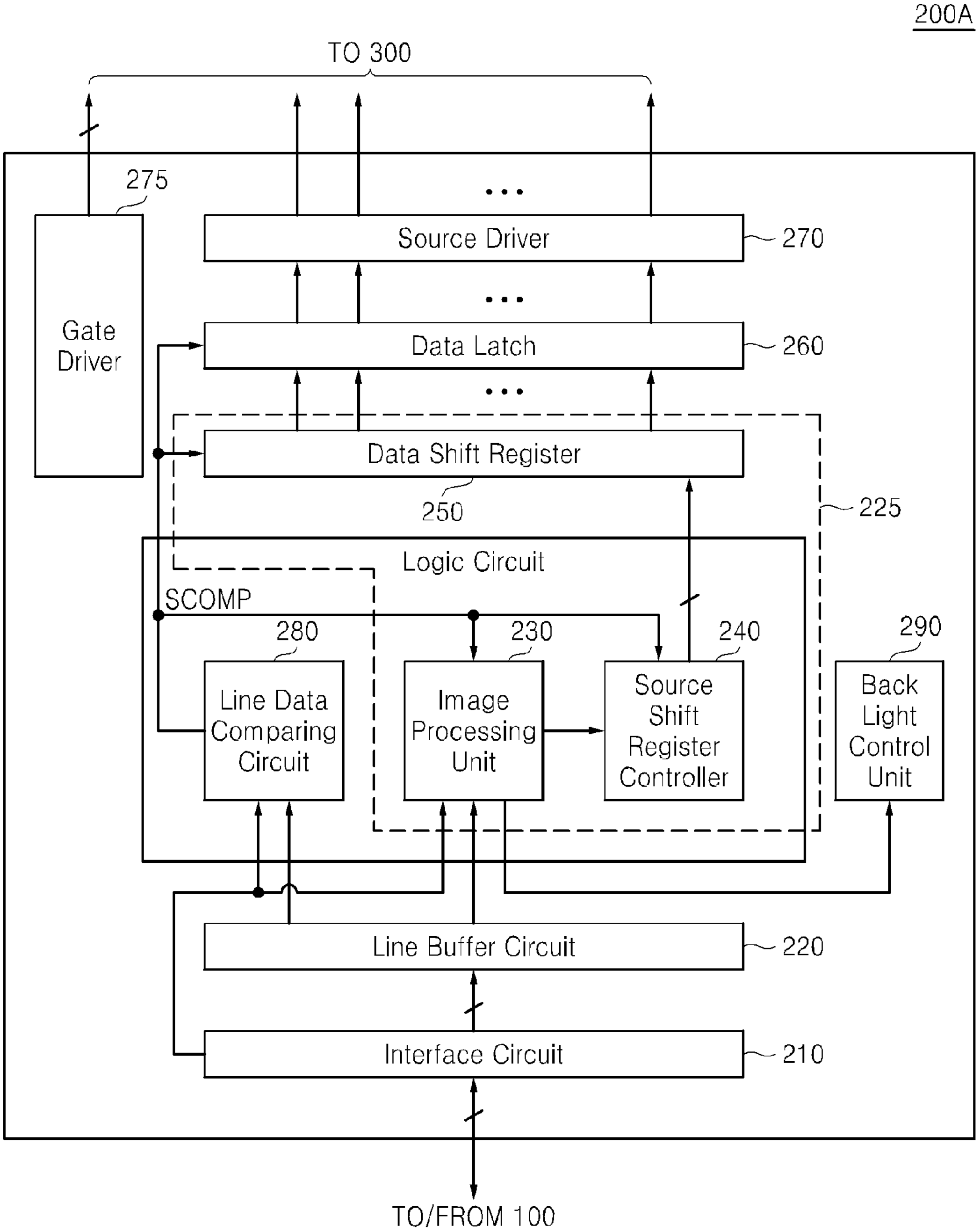
FIG. 2 is a block diagram illustrating an example of the display driver integrated circuit (DDI) illustrated in FIG. 1.

FIG. 2 is a block diagram illustrating an example 200A of the DDI 200 illustrated in FIG. 1. Referring to FIGS. 1 and 2, the DDI 200A may include an interface circuit 210, a line buffer circuit 220, an intermediate processing circuit 225, a data latch 260, a source driver 270, a gate driver 275, a line data comparing circuit 280, and a back light control unit 290.

The interface circuit 210 may interface signals between the AP 100 and the DDI 200A. The interface circuit 210 may transmit a synchronizing signal and/or a clock signal to the line buffer circuit 220, an image processing unit 230 included in the intermediate processing circuit 225, and the line data comparing circuit 280.

The line buffer circuit 220 may buffer display data transmitted from the interface circuit 210 in units of lines. The line buffer circuit 220 may be replaced with a graphic memory (not shown) in other embodiments. The structure and operation of the line buffer circuit 220 will be described in detail with reference to FIG. 3 later.

The intermediate processing circuit 225 may process line data transmitted from the line buffer circuit 220 to the data latch 260. The processing may include image enhancement, line data shifting, and so on. The intermediate processing circuit 225 may include the image processing unit 230, a source shift register controller 240, and a data shift register 250. The intermediate processing circuit 225 may also include various circuits to process line data apart from the image processing unit 230, the source shift register controller 240, and the data shift register 250 and may be diversely changed in terms of design.

The image processing unit 230 may process line data received from the line buffer circuit 220 to enhance the quality of an image or may generate information (e.g., frame information) necessary to perform the back light control of the back light control unit 290 using the line data. The image processing unit 230 will be described in detail with reference to FIG. 5 later.

The source shift register controller 240 may control the operation of the data shift register 250. The data shift register 250 may shift line data received through the source shift register controller 240 according to the control of the source shift register controller 240. The data shift register 250 may sequentially transmit the shifted line data to the data latch 260. The data latch 260 may store the line data sequentially transmitted from the data shift register 250 and may transmit the line data to the source driver 270 in units of horizontal lines.

The source driver 270 may transmit the line data received from the data latch 260 to the display panel 300. The gate driver 275 may drive gate lines of the display panel 300. In other words, the operation of pixels of the display panel 300 is controlled by the source driver 270 and the gate driver 275 so that an image corresponding to image data or graphic data received from the AP 100 is displayed on the display panel 300.

The line data comparing circuit 280 may compare previous line data and current line data, which are received from the line buffer circuit 220, with each other and generate a comparison signal SCOMP according to a comparison result.

In some exemplary embodiments of the present general inventive concept, a previous line data signal and a current line data signal may be the former and latter ones, respectively, of two line data signals consecutively output from the line buffer circuit 220.

The comparison signal SCOMP may control the activation or deactivation of the image processing unit 230, the source shift register controller 240, and the data shift register 250. According to some embodiments of the present general inventive concept, the activation or deactivation may be controlled by gating an input data signal or a clock signal or by controlling supply power.

The data latch 260 may output the previous line data, which has been processed by the intermediate processing circuit 225 and stored in the data latch 260, to the source driver 270 as output data corresponding to the current line data in response to the comparison signal SCOMP when the current line data is the same as the previous line data. The back light control unit 290 may control the back light of the display panel 300 based on information transmitted from the image processing unit 230.

Figure 3:
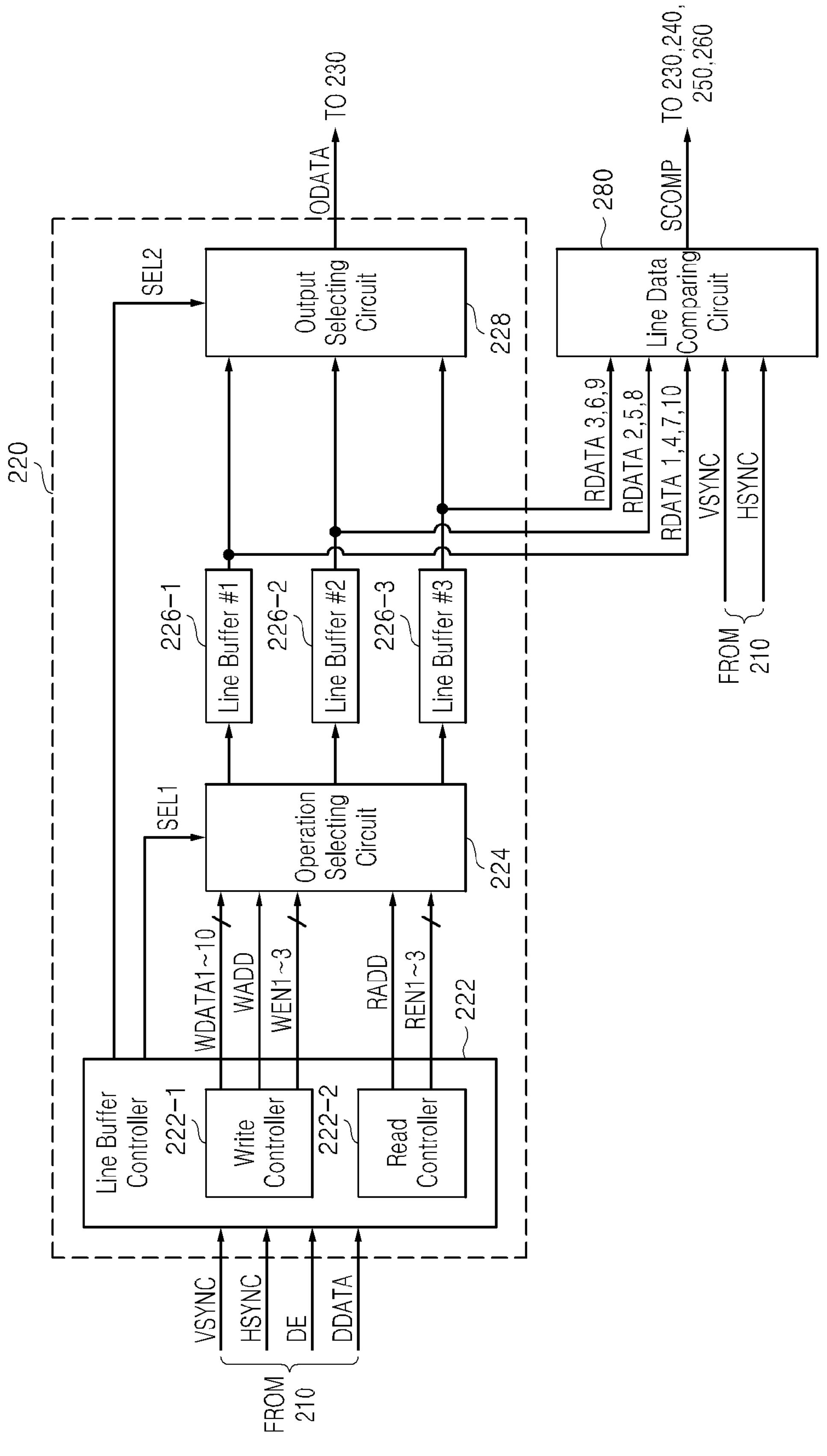
FIG. 3 is a block diagram illustrating the line buffer circuit and the line data comparing circuit illustrated in FIG. 2.
Figure 4:
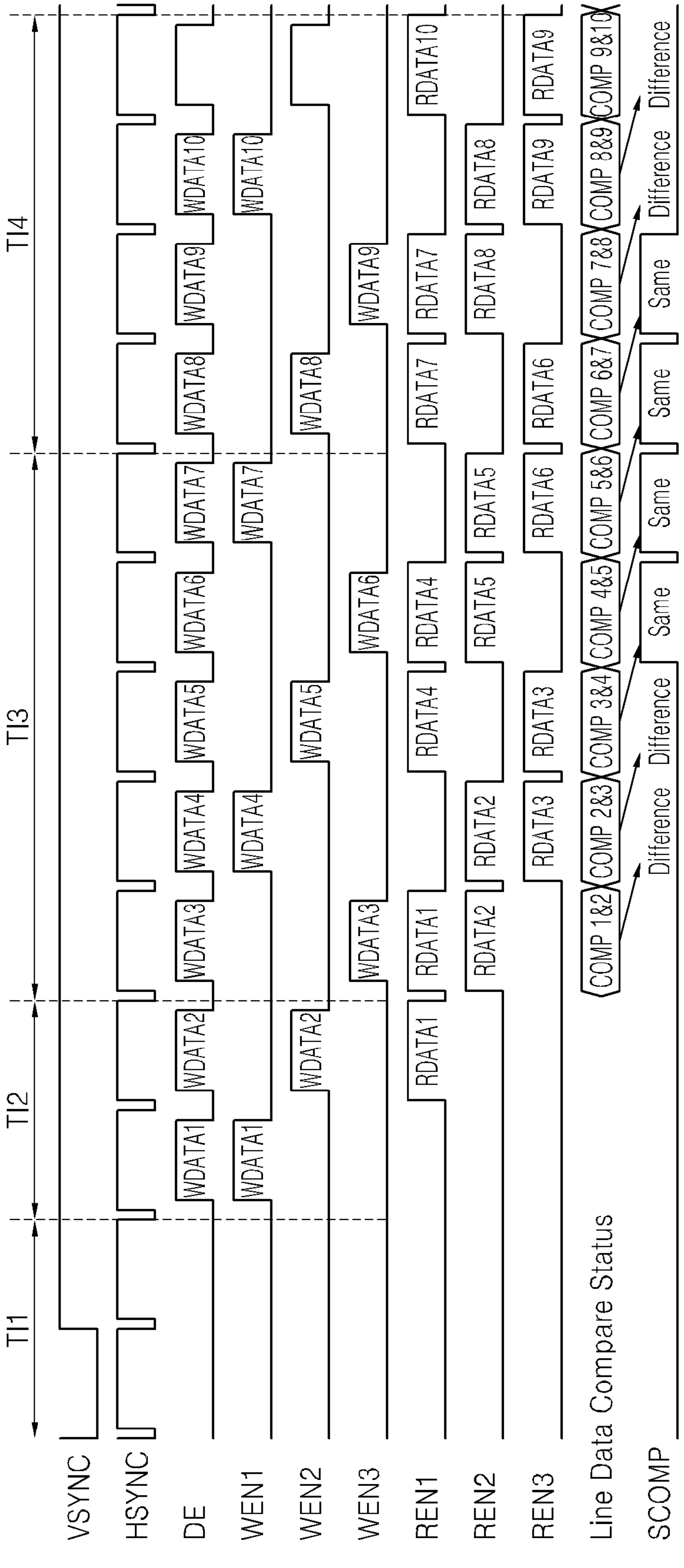
FIG. 4 is a timing chart illustrating the operation of the line buffer circuit and the line data comparing circuit illustrated in FIG. 3.

FIG. 3 is a block diagram illustrating the line buffer circuit 220 and the line data comparing circuit 280 illustrated in FIG. 2. FIG. 4 is a timing chart illustrating the operation of the line buffer circuit 220 and the line data comparing circuit 280 illustrated in FIG. 3.

Referring to FIGS. 2 through 4, the line buffer circuit 220 may include a line buffer controller 222, an operation selecting circuit 224, a plurality of line buffers 226-1 through 226-3, and an output selecting circuit 228.

The line buffer controller 222 may control an operation of buffering display data DDATA in units of lines in response to a vertical synchronizing signal VSYNC, a horizontal synchronizing signal HSYNC, and a data enable signal DE, which are transmitted from the interface circuit 210. The line buffer controller 222 may include a write controller 222-1 that controls a write operation of the line buffer circuit 220 and a read controller 222-2 that controls a read operation of the line buffer circuit 220.

The write controller 222-1 may transmit write line data signals WDATA1 through WDATA10, a write address signal WADD, and write enable signals WEN1 through WEN3 to the operation selecting circuit 224.

The write enable signal WEN1 is a signal to activate the first line buffer 226-1 corresponding to a write operation, the write enable signal WEN2 is a signal to activate the second line buffer 226-2 corresponding to the write operation, and the write enable signal WEN3 is a signal to activate the third line buffer 226-3 corresponding to the write operation. The write address signal WADD may include information about a position, e.g., address information of one of the line buffers 226-1 through 226-3, to which the write line data signals WDATA1 through WDATA10 will be written. Each of the write enable signals WEN1 through WEN3 may be activated in synchronization with the data enable signal DE.

The operation selecting circuit 224 may select a write operation according to an operation selecting signal SEL1 transmitted from the line buffer controller 222. At this time, the operation selecting circuit 224 may transmit the write line data signals WDATA1 through WDATA10 sequentially and respectively to the line buffers 226-1 through 226-3 based on the write address signal WADD and the write enable signals WEN1 through WEN3, which are transmitted from the write controller 222-1.

Referring to FIG. 4, the write line data signal WDATA1 may be transmitted to the first line buffer 226-1 in response to the write enable signal WEN1. The write line data signal WDATA2 may be transmitted to the second line buffer 226-2 in response to the write enable signal WEN2. The write line data signal WDATA3 may be transmitted to the third line buffer 226-3 in response to the write enable signal WEN3. In this manner, the remaining write line data signals WDATA4 through WDATA10 may be sequentially and respectively transmitted to the line buffers 226-1 through 226-3.

The read controller 222-2 may transmit a read address signal RADD and read enable signals REN1 through REN3 to the operation selecting circuit 224.

The read enable signal REN1 is a signal to activate the first line buffer 226-1 corresponding to a read operation, the read enable signal REN2 is a signal to activate the second line buffer 226-2 corresponding to the read operation, and the read enable signal REN3 is a signal to activate the third line buffer 226-3 corresponding to the read operation. The read address signal RADD may include address information of the line buffers 226-1 through 226-3 from which data will be read.

The operation selecting circuit 224 may select a read operation in response to the operation selecting signal SEL1 transmitted from the line buffer controller 222. The operation selecting circuit 224 may control the line buffers 226-1 through 226-3 to perform the read operation based on the read address signal RADD and the read enable signals REN1 through REN3, which are transmitted from the read controller 222-2. At this time, the line buffers 226-1 through 226-3 may transmit read line data signals RDATA1 through RDATA10 to the output selecting circuit 228 and the line data comparing circuit 280 according to the control of the operation selecting circuit 224. In other words, the read line data signals RDATA1 through RDATA10 may be output sequentially and respectively from the line buffers 226-1 through 226-3.

Referring to FIG. 4, the read line data signal RDATA1 may be output from the first line buffer 226-1 in response to the read enable signal REN1. The read line data signal RDATA2 may be output from the second line buffer 226-2 in response to the read enable signal REN2. The read line data signal RDATA3 may be output from the third line buffer 226-3 in response to the read enable signal REN3. In this manner, the remaining read line data signals RDATA4 through RDATA10 may be sequentially and respectively output from the line buffers 226-1 through 226-3.

To compare a previous line data signal with a current line data signal, the read line data signals RDATA1 through RDATA10 may be read twice, respectively.

The output selecting circuit 228 may select and output one of the read line data signals RDATA1 through RDATA10 received from the line buffers 226-1 through 226-3 as an output line data signal ODATA in response to an output selecting signal SEL2 received from the line buffer controller 222.

The line data comparing circuit 280 may compare previous line data with current line data based on the read line data signals RDATA1 through RDATA10 received from the line buffers 226-1 through 226-3 to find out whether they are the same as one another.

Referring to FIG. 4, a first period TI1 is a vertical back porch period, a second period TI2 is a period in which the write line data signals WDATA1 and WDATA2 are different from each other, a fourth period TI4 is a period in which the write line data signals WDATA8 through WDATA10 are different from one another, and a third period TI3 is a period in which the write line data signals WDATA3 through WDATA7 are the same as one another.

In some cases, the line data comparing circuit 280 may compare previous line data (e.g., the read line data signal RDATA1) with current line data (e.g., the read line data signal RDATA2) and generate the comparison signal SCOMP including information indicating that the previous line data is different from the current line data. In other cases, the line data comparing circuit 280 may compare previous line data (e.g., the read line data signal RDATA3) with current line data (e.g., the read line data signal RDATA4) and generate the comparison signal SCOMP including information indicating that the previous line data is the same as the current line data. The line data comparing circuit 280 may output the comparison signal SCOMP in synchronization with the vertical synchronizing signal VSYNC and the horizontal synchronizing signal HSYNC.

Figure 5:
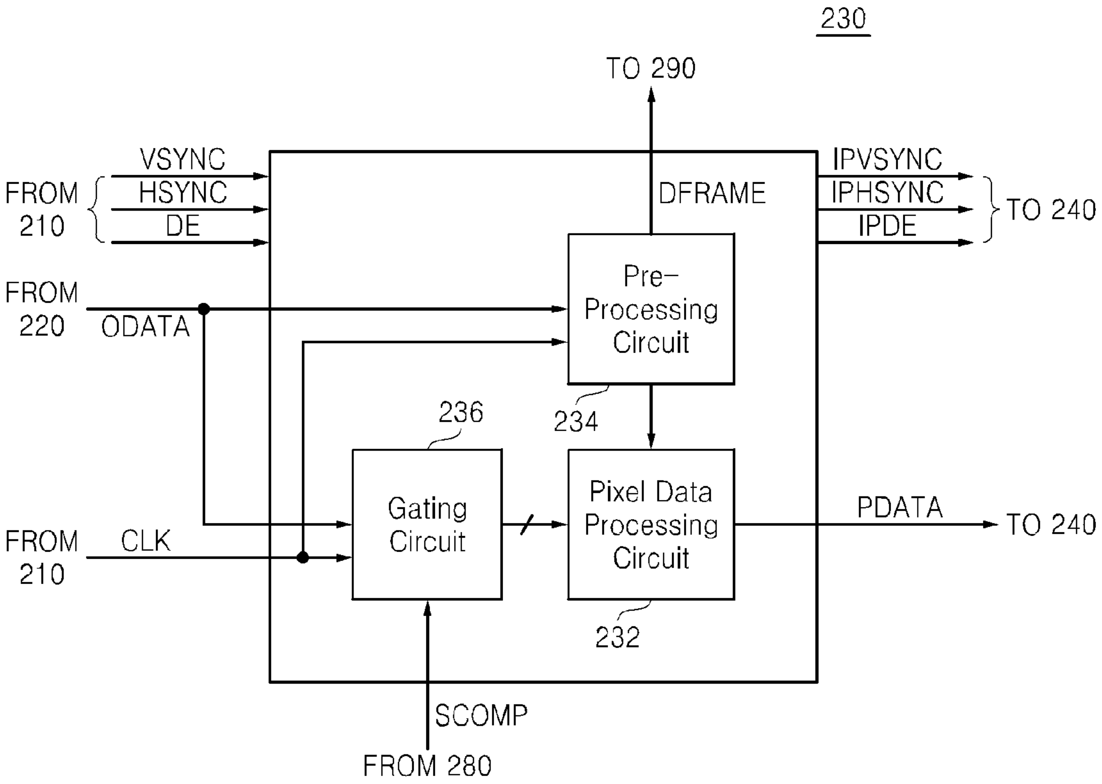
FIG. 5 is a block diagram illustrating the image processing unit illustrated in FIG. 2.
Figure 6:
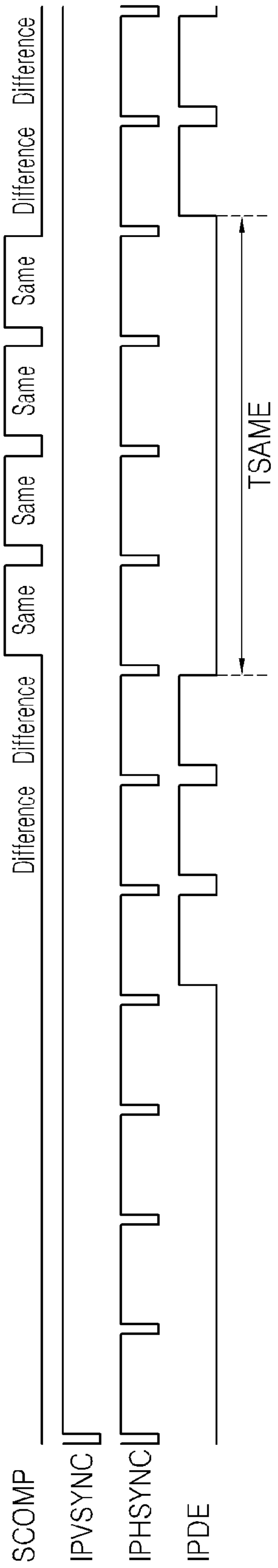
FIG. 6 is a timing chart illustrating the operation of the image processing unit illustrated in FIG. 5.

FIG. 5 is a block diagram illustrating the image processing unit 230 illustrated in FIG. 2. FIG. 6 is a timing chart illustrating the operation of the image processing unit 230 illustrated in FIG. 5. Referring to FIGS. 2, 5, and 6, the image processing unit 230 may include a pixel data processing circuit 232, a pre-processing circuit 234, and a gating circuit 236.

The pixel data processing circuit 232 may process the output line data signal ODATA received from the line buffer circuit 220, thereby improving the image quality. In some cases, the pixel data processing circuit 232 may filter unnecessary data from the output line data signal ODATA received from the line buffer circuit 220. The pixel data processing circuit 232 may transmit a processed line data signal PDATA to the source shift register controller 240.

The pre-processing circuit 234 may generate frame information, which may be necessary to perform the back light control of the back light control unit 290, using the output line data signal ODATA received from the line buffer circuit 220. The pre-processing circuit 234 may transmit a frame data signal DFRAME including the frame information to the back light control unit 290. The pre-processing circuit 234 may also provide information necessary to perform the processing operation of the pixel data processing circuit 232.

The gating circuit 236 may gate the output line data signal ODATA received from the line buffer circuit 220 to the pixel data processing circuit 232 based on the comparison signal SCOMP received from the line data comparing circuit 280. When the previous line data is the same as the current line data, the gating circuit 236 may block the output line data signal ODATA from being transmitted to the pixel data processing circuit 232. When the previous line data is different from the current line data, the gating circuit 236 may transmit the output line data signal ODATA to the pixel data processing circuit 232.

The gating circuit 236 may also gate a clock signal CLK from the interface circuit 210 to the pixel data processing circuit 232 based on the comparison signal SCOMP. When the previous line data is the same as the current line data, the gating circuit 236 may block the clock signal CLK from being transmitted to the pixel data processing circuit 232. When the previous line data is different from the current line data, the gating circuit 236 may transmit the clock signal CLK to the pixel data processing circuit 232. Alternatively, the gating circuit 236 may control power supply to the pixel data processing circuit 232 based on the comparison signal SCOMP.

The gating circuit 236 does not gate (or block) the output line data signal ODATA, the clock signal CLK, or power supply to the pre-processing circuit 234.

Referring to FIG. 6, an IP vertical synchronizing signal IPVSYNC corresponds to the vertical synchronizing signal VSYNC, an IP horizontal synchronizing signal IPHSYNC corresponds to the horizontal synchronizing signal HSYNC, and an IP data enable signal IPDE corresponds to the data enable signal DE. The IP vertical synchronizing signal IPVSYNC, the IP horizontal synchronizing signal IPHSYNC, and the IP data enable signal IPDE may be used in the intermediate processing circuit 225.

The IP data enable signal IPDE may be deactivated in a "same" period TSAME, in which previous line data is the same as current line data, in response to the comparison signal SCOMP. In other words, power consumption of the image processing unit 230 may be reduced in the same period TSAME.

Figure 7:
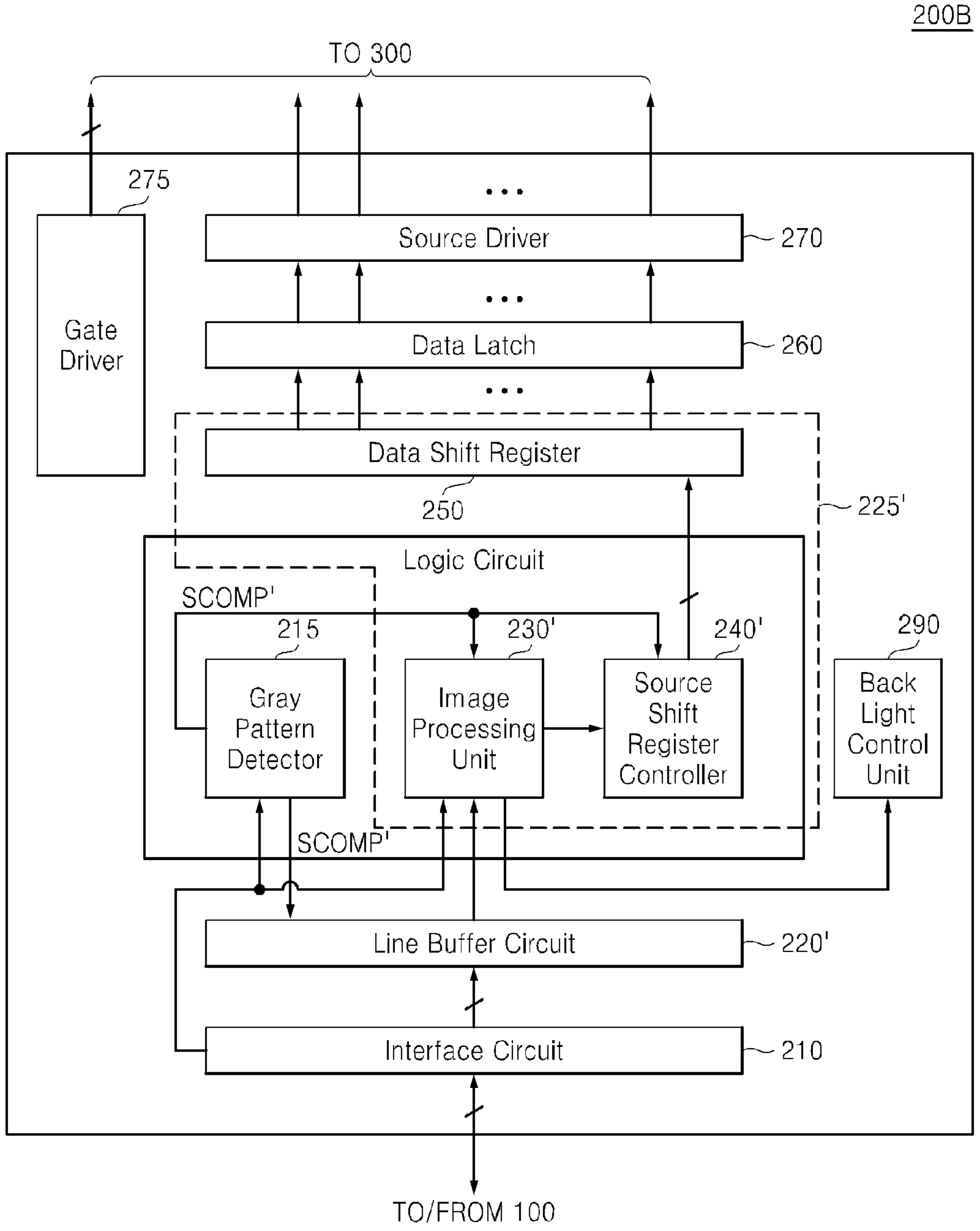
FIG. 7 is a block diagram illustrating another example of the DDI illustrated in FIG. 1.

FIG. 7 is a block diagram illustrating another example 200B of the DDI 200 illustrated in FIG. 1. Referring to FIGS. 1, 2, and 7, apart from a gray pattern detector 215, a line buffer circuit 220', and an intermediate processing circuit 225', the structure and operation of the DDI 200B illustrated in FIG. 7 is substantially the same as that of the DDI 200A illustrated in FIG. 2.

The gray pattern detector 215 may detect a gray pattern based on color data signals received from the interface circuit 210. The gray pattern may be a data pattern in which the color data signals are the same as each other. The gray pattern detector 215 will be described in detail with reference to FIG. 8 later. The structure and operation of the line buffer circuit 220' will be described in detail with reference to FIGS. 9 and 10 later.

The intermediate processing circuit 225' may include an image processing unit 230', a source shift register controller 240', and a data shift register 250. The image processing unit 230' may activate only the parts it uses to process a single one of the color data signals, based on a gray pattern detection signal SCOMP' received from the gray pattern detector 215. The source shift register controller 240' may also activate only the parts it uses to process a single one of the color data signals, based on the gray pattern detection signal SCOMP'.

Figure 8:
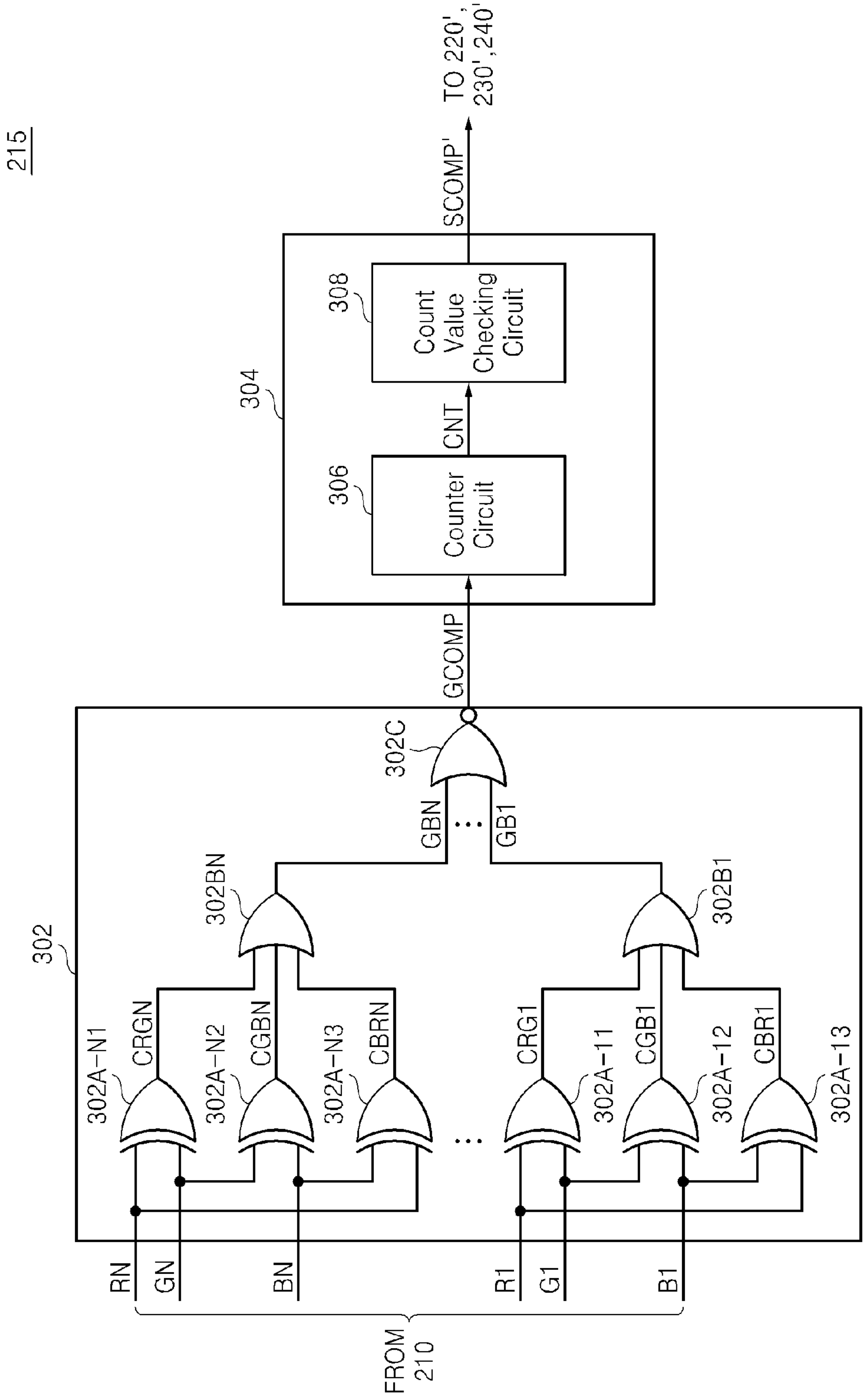
FIG. 8 is a circuit diagram illustrating the gray pattern detector illustrated in FIG. 7.

FIG. 8 is a circuit diagram illustrating the gray pattern detector 215 illustrated in FIG. 7. Referring to FIGS. 7 and 8, the gray pattern detector 215 may include a comparison circuit 302 and a gray pattern period checking circuit 304.

The comparison circuit 302 may include a plurality of XOR gates 302A-11 through 302A-N3, a plurality of OR gates 302B1 through 302BN, and a NOR gate 302C. Each of the XOR gates 302A-11 through 302A-N3 may compare two bits of respective color data signals with each other.

The XOR gate 302A-11 may compare a first bit R1 of a color data signal corresponding to red with a first bit G1 of a color data signal corresponding to green. At this time, the XOR gate 302A-11 may output a color comparison signal CRG1 according to whether the first bits R1 and G1 are the same as each other. For instance, when the first bits R1 and G1 are the same as each other, the XOR gate 302A-11 may output the color comparison signal CRG1 having a low level or a value of "0". When the first bits R1 and G1 are different from each other, the XOR gate 302A-11 may output the color comparison signal CRG1 having a high level or a value of "1".

The XOR gate 302A-12 may compare the first bit G1 of the color data signal corresponding to green with a first bit B1 of a color data signal corresponding to blue. At this time, the XOR gate 302A-12 may output a color comparison signal CGB1 according to whether the first bits G1 and B1 are the same as each other. For instance, when the first bits G1 and B1 are the same as each other, the XOR gate 302A-12 may output the color comparison signal CGB1 having a low level or a value of "0". When the first bits G1 and B1 are different from each other, the XOR gate 302A-12 may output the color comparison signal CGB1 having a high level or a value of "1".

The XOR gate 302A-13 may compare the first bit B1 of the color data signal corresponding to blue with the first bit R1 of the color data signal corresponding to red. At this time, the XOR gate 302A-13 may output a color comparison signal CBR1 according to whether the first bits B1 and R1 are the same as each other.

For instance, when the first bits B1 and R1 are the same, the XOR gate 302A-13 may output the color comparison signal CBR1 having a low level or a value of "0". When the first bits B1 and R1 are different, the XOR gate 302A-13 may output the color comparison signal CBR1 having a high level or a value of "1". The remaining XOR gates including the XOR gates 302A-N1 through 302A-N3 may operate in the same manner as the XOR gates 302A-11 through 302A-13.

The OR gate 302B1 outputs a gray bit signal GB1 having a low level or a value of "0" when the color comparison signals CRL1, CGB1, and CBR1 all have the low level or the value of "0". In other words, the OR gate 302B1 outputs the gray bit signal GB1 having the low level or the value of "0" when the first bits R1, G1, and B1 are all the same as one another. The remaining OR gates including the OR gate 302BN may operate in the same manner as the OR gate 302B1.

The NOR gate 302C receives gray bit signals GB1 through GBN and outputs a comparison signal GCOMP having a high level or a value of "1" when all the gray bit signals GB1 through GBN have the low level or the value of "0". In other words, the NOR gate 302C may output the comparison signal GCOMP having the high level or the value of "1" when the color data signals indicate a gray color.

The gray pattern period checking circuit 304 may include a counter circuit 306 and a count value checking circuit 308.

The counter circuit 306 may count the number of times the comparison signal GCOMP output from the comparison circuit 302 has the high level or the value of "1" and may transmit a count signal CNT corresponding to a count result to the count value checking circuit 308. In other words, the count signal CNT may indicate the number of bits which are the same as one another among the color data signals.

The count value checking circuit 308 may compare a count value of the count signal CNT with a reference value and output a gray pattern detection signal SCOMP' according to a comparison result. According to some embodiments of the present general inventive concept, the reference value may be set by a user or may be the same as a value of the length of a horizontal line of the display panel 300.

Figure 9:
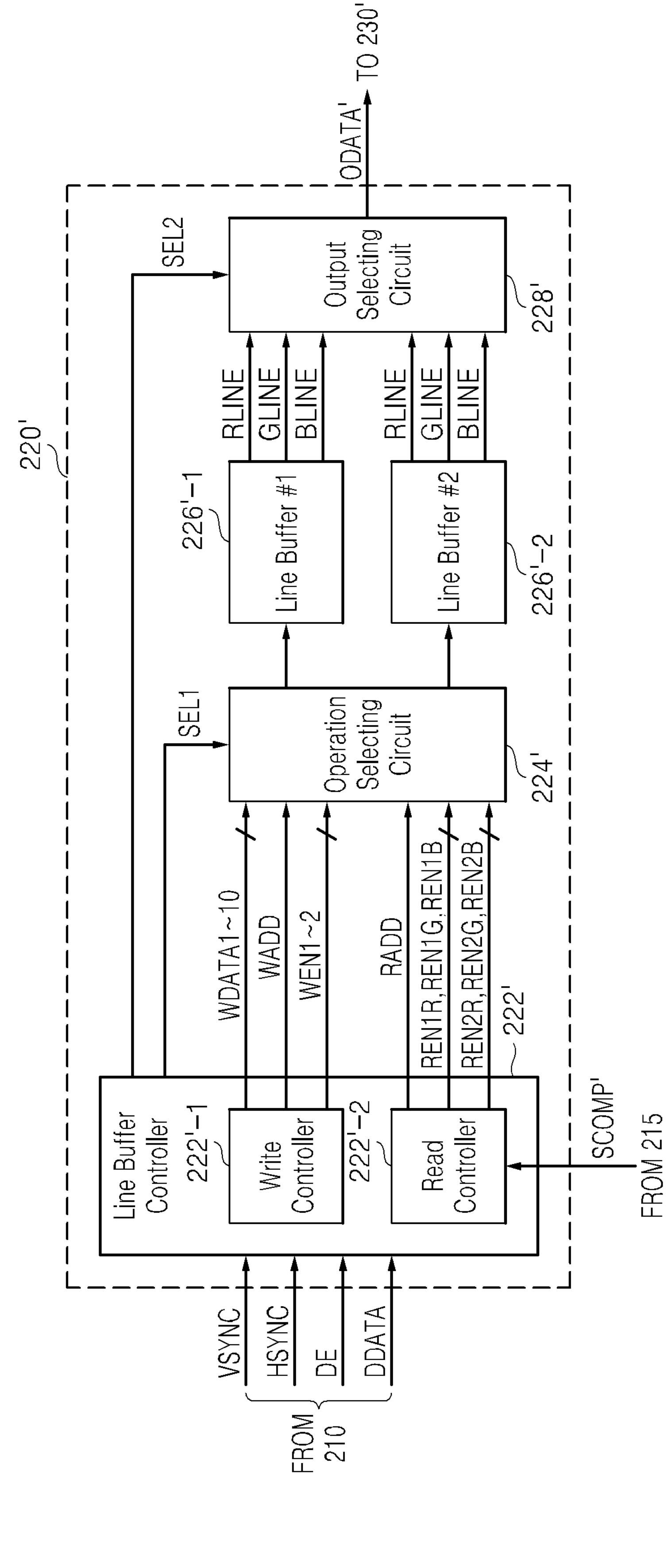
FIG. 9 is a block diagram illustrating the buffer line circuit illustrated in FIG. 7.
Figure 10:
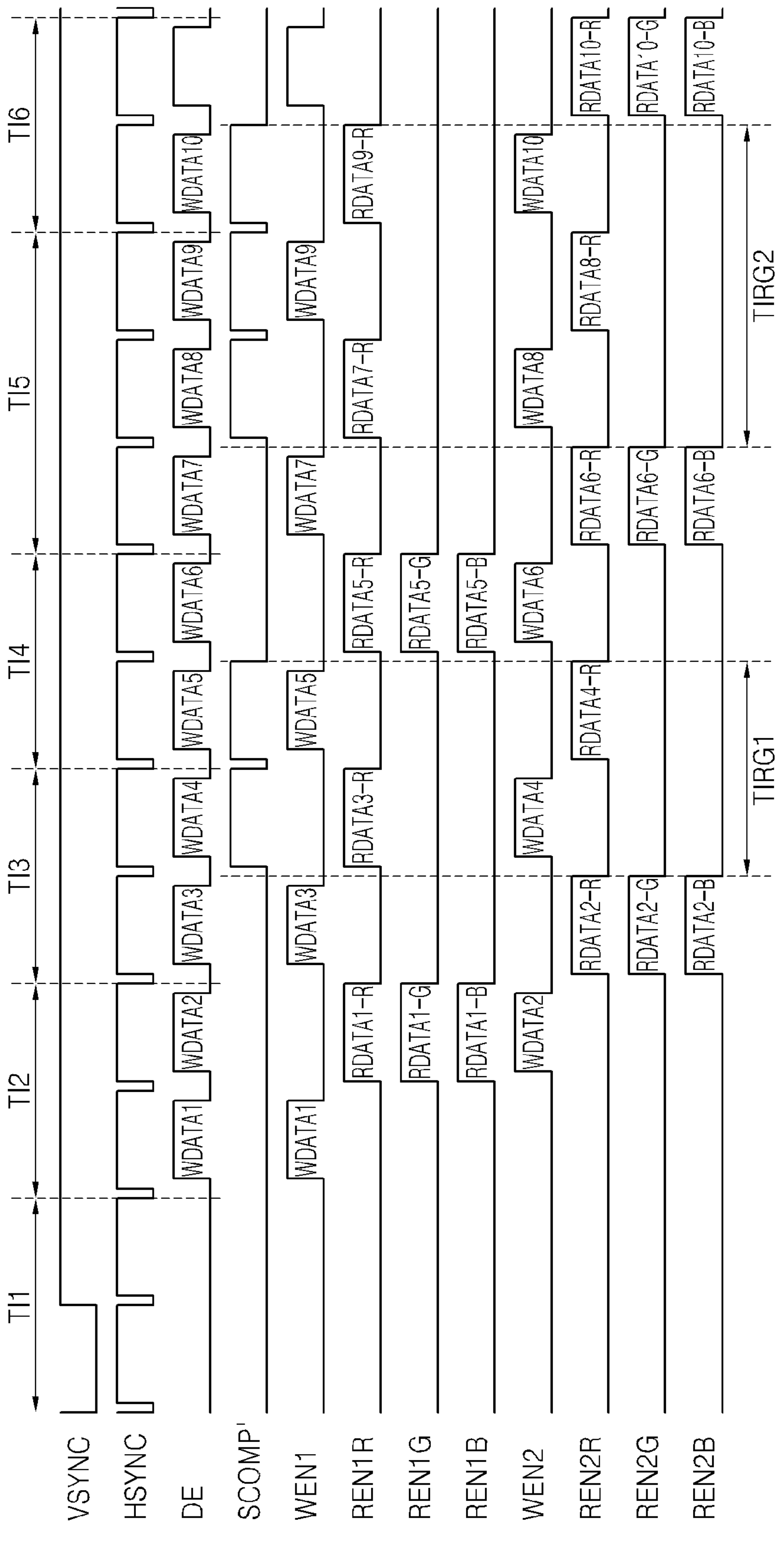
FIG. 10 is a timing chart illustrating the operation of the line buffer circuit illustrated in FIG. 9.

FIG. 9 is a block diagram illustrating the line buffer circuit 220' illustrated in FIG. 7. FIG. 10 is a timing chart illustrating the operation of the line buffer circuit 220' illustrated in FIG. 9. Referring to FIGS. 7 through 10, the line buffer circuit 220' illustrated in FIG. 9 may include a line buffer controller 222', an operation selecting circuit 224', line buffers 226'-1 and 226'-2, and an output selecting circuit 228'.

The line buffer controller 222' may include a write controller 222'-1 and a read controller 222'-2. The structure and operation of the write controller 222'-1 is substantially the same as that of the write controller 222-1 illustrated in FIG. 3.

The read controller 222'-2 may generate read enable signals REN1R, REN1G, REN1B, REN2R, REN2G, and REN2B to activate a read operation of the first and second line buffers 226'-1 and 226'-2 based on the gray pattern detection signal SCOMP'. The read enable signals REN1R, REN1G and REN1B may allow only color data respectively corresponding to red, green, and blue to be read from the first line buffer 226'-1. The read enable signals REN2R, REN2G and REN2B may allow only color data respectively corresponding to red, green, and blue to be read from the second line buffer 226'-2.

Referring to FIG. 10, the first period TI1 is a vertical back porch period, third and fifth periods TI3 and TI5 are periods in which color data signals in gray pattern are input to the line buffer circuit 220', and second, fourth, and sixth periods TI2, TI4, and TI6 are periods in which color data signals not in gray pattern are input to the line buffer circuit 220'.

Color data RDATA1-R, RDATA1-G, and RDATA1-B read from the line buffer 226'-1 or 226'-2 correspond to color data WDATA1 written to the line buffer 226'-1 or 226'-2 and may be distinguished from one another by color components.

In periods TIRG1 and TIRG2 in which the gray pattern is detected based on the gray pattern detection signal SCOMP', color data corresponding to only one color (e.g., red) among red, green, and blue may be read. For instance, in the gray pattern detected period TIRG1, only third and fourth color data RDATA3-R and RDATA4-R corresponding to red may be read. In the gray pattern detected period TIRG2, only seventh through tenth color data RDATA7-R, RDATA8-R, RDATA9-R, and RDATA10-R corresponding to red may be read.

With the exception that there are two line buffers 226'-1 and 226'-2 connected to the operation selecting circuit 224' and the read enable signals REN1R, REN1G, REN1B, REN2R, REN2G, and REN2B are used, the operation of the operation selecting circuit 224' is substantially the same as that of the operation selecting circuit 224 illustrated in FIG. 3.

The line buffers 226'-1 and 226'-2 may output the color data signals RDATA1-R through RDATA10-R, RDATA1-G through RDATA10-G, and RDATA1-B through RDATA10-B to the output selecting circuit 228' according to the control of the operation selecting circuit 224'. Each of the line buffers 226'-1 and 226'-2 may include separate output lines RLINE, GLINE, and BLINE to respectively output color data signals respectively corresponding to red, green, and blue, but the present general inventive concept is not restricted thereto.

According to exemplary embodiments of the present general inventive concept, when the gray pattern is not detected, the output lines RLINE, GLINE, and BLINE of the line buffers 226'-1 and 226'-2 may be all activated according to the read enable signals REN1R, REN1G, REN1B, REN2R, REN2G, and REN2B. When the gray pattern is detected, only one (for example, RLINE) of the output lines RLINE, GLINE, and BLINE of the line buffers 226'-1 and 226'-2 may be activated according to the read enable signals REN1R, REN1G, REN1B, REN2R, REN2G, and REN2B.

The output selecting circuit 228' may select and output one of the color data signals output from each of the line buffers 226'-1 and 226'-2 as an output color data signal ODATA' in response to the selection signal SEL2.

Figure 11:
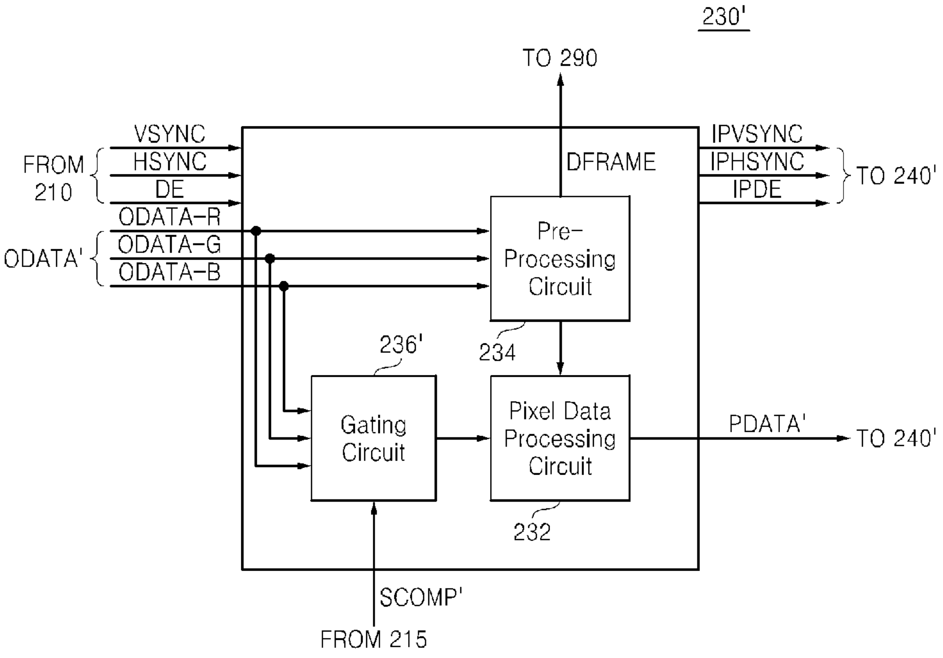
FIG. 11 is a block diagram illustrating the image processing unit illustrated in FIG. 7.

FIG. 11 is a block diagram illustrating the image processing unit 230' illustrated in FIG. 7. Referring to FIGS. 7 and 11, the image processing unit 230' may include the pixel data processing circuit 232, the pre-processing circuit 234, and a gating circuit 236'.

The gating circuit 236' may gate color data signals ODATA-R, ODATA-G, and ODATA-B included in the output color data signal ODATA' according to the gray pattern detection signal SCOMP'.

When the gray pattern is not detected, the gating circuit 236' may transmit all of the color data signals ODATA-R, ODATA-G, and ODATA-B to the pixel data processing circuit 232.

When the gray pattern is detected, the gating circuit 236' may transmit only one (e.g., ODATA-R) of the color data signals ODATA-R, ODATA-G, and ODATA-B to the pixel data processing circuit 232. At this time, the pixel data processing circuit 232 may process the color data signal (e.g., ODATA-R) received from the gating circuit 236', duplicate a processed color data signal to generate the other color data signals (e.g., ODATA-G and ODATA-B), and output a processed color data signal PDATA'.

Figure 12:
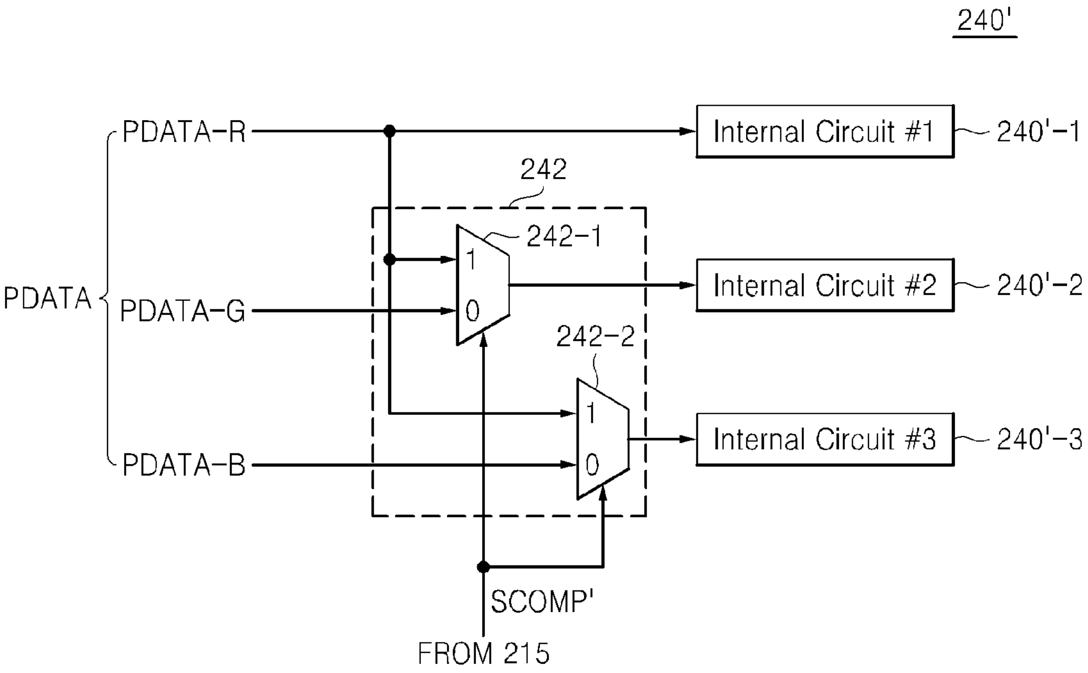
FIG. 12 is a block diagram illustrating the source shift register controller illustrated in FIG. 7.

FIG. 12 is a block diagram illustrating the source shift register controller 240' illustrated in FIG. 7. Referring to FIGS. 7 and 12, the source shift register controller 240' may include a data signal selecting circuit 242 and internal circuits 240'-1 through 240'-3.

The data signal selecting circuit 242 may include a first selector 242-1 and a second selector 242-2. Each of the first and second selectors 242-1 and 242-2 may be implemented as a multiplexer. The first internal circuit 240'-1 processes color data corresponding to red. The second internal circuit 240'-2 processes color data corresponding to green. The third internal circuit 240'-3 processes color data corresponding to blue.

The data signal selecting circuit 242 may selectively transmit red color data signal PDATA-R, green color data signal PDATA-G, and blue color data signal PDATA-B, which construct the processed color data signal PDATA', to the internal circuits 240'-1 through 240'-3, respectively, based on the gray pattern detection signal SCOMP'.

When the gray pattern is not detected, the first selector 242-1 may select and output the green color data signal PDATA-G to the second internal circuit 240'-2 and the second selector 242-2 may select and output the blue color data signal PDATA-B to the third internal circuit 240'-3. When the gray pattern is detected, the first selector 242-1 may select and output the red color data signal PDATA-R to the second internal circuit 240'-2 and the second selector 242-2 may also select and output the red color data signal PDATA-R to the third internal circuit 240'-3.

Figure 13:
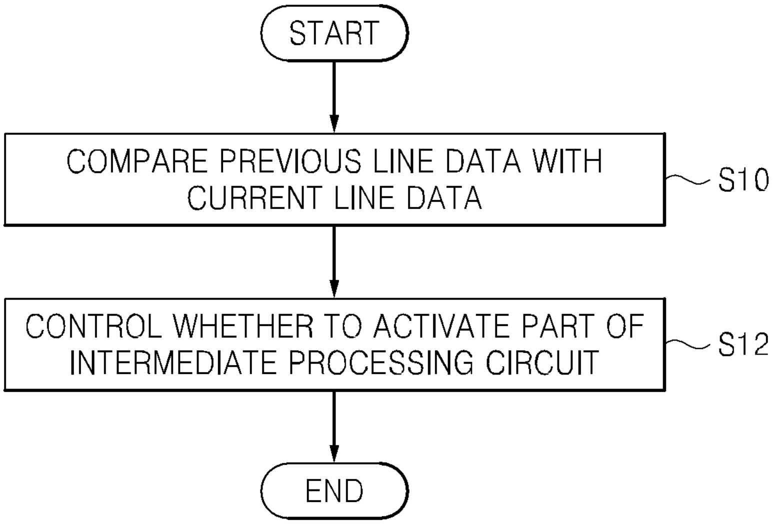
FIG. 13 is a flowchart illustrating a method of operating a DDI according to an exemplary embodiment of the present general inventive concept.

FIG. 13 is a flowchart illustrating a method of operating the DDI 200A according to an exemplary embodiment of the present general inventive concept. Referring to FIGS. 1 through 6 and FIG. 13, the line data comparing circuit 280 may compare previous line data with current line data based on the read line data signals RDATA1 through RDATA10 to find out whether the previous line data is the same as the current line data in operation S10.

In detail, the line data comparing circuit 280 may compare previous line data, e.g., the read line data signal RDATA1 with current line data, e.g., the read line data signal RDATA2 and may generate the comparison signal SCOMP including information that the previous line data is different from the current line data.

The line data comparing circuit 280 may compare previous line data, e.g., the read line data signal RDATA3 with current line data, e.g., the read line data signal RDATA4 and may generate the comparison signal SCOMP including information that the previous line data is the same as the current line data.

Whether part of the intermediate processing circuit 225 is activated may be controlled according to the comparison signal SCOMP in operation S12. In detail, whether the image processing unit 230, the source shift register controller 240, and the data shift register 250 are activated may be controlled according to the comparison signal SCOMP. The pre-processing circuit 234 included in the intermediate processing circuit 225 may be activated even when the previous line data is the same as the current line data.

Figure 14:
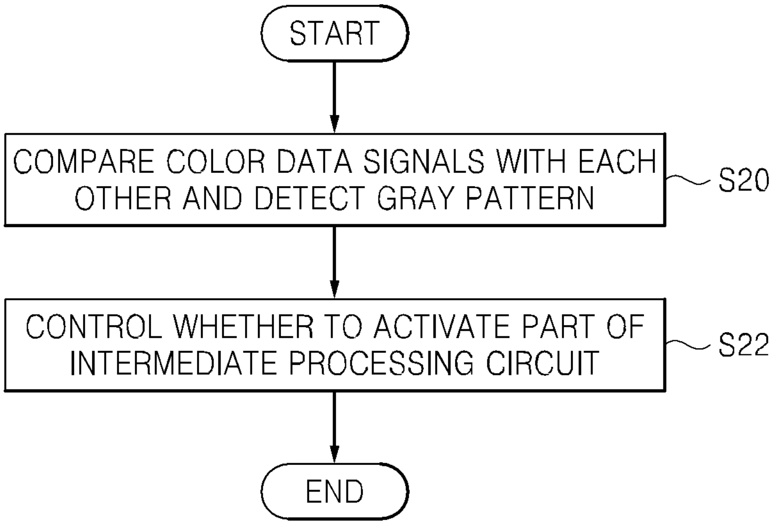
FIG. 14 is a flowchart illustrating a method of operating a DDI according to another exemplary embodiment of the present general inventive concept.

FIG. 14 is a flowchart illustrating a method of operating the DDI 200B according to another exemplary embodiment of the present general inventive concept. Referring to FIGS. 7 through 12 and FIG. 14, the gray pattern detector 215 may detect a gray pattern based on the color data signals R1 through RN, G1 through GN, and B1 through BN received from the interface circuit 210 in operation S20.

The gray pattern detector 215 may generate the gray pattern detection signal SCOMP' according to a detection result. Whether part of the intermediate processing circuit 225' is activated may be controlled according to the gray pattern detection signal SCOMP' in operation S22. In detail, whether part of each of the image processing unit 230', the source shift register controller 240', and the data shift register 250' is activated may be controlled according to the gray pattern detection signal SCOMP'.

Figure 15:
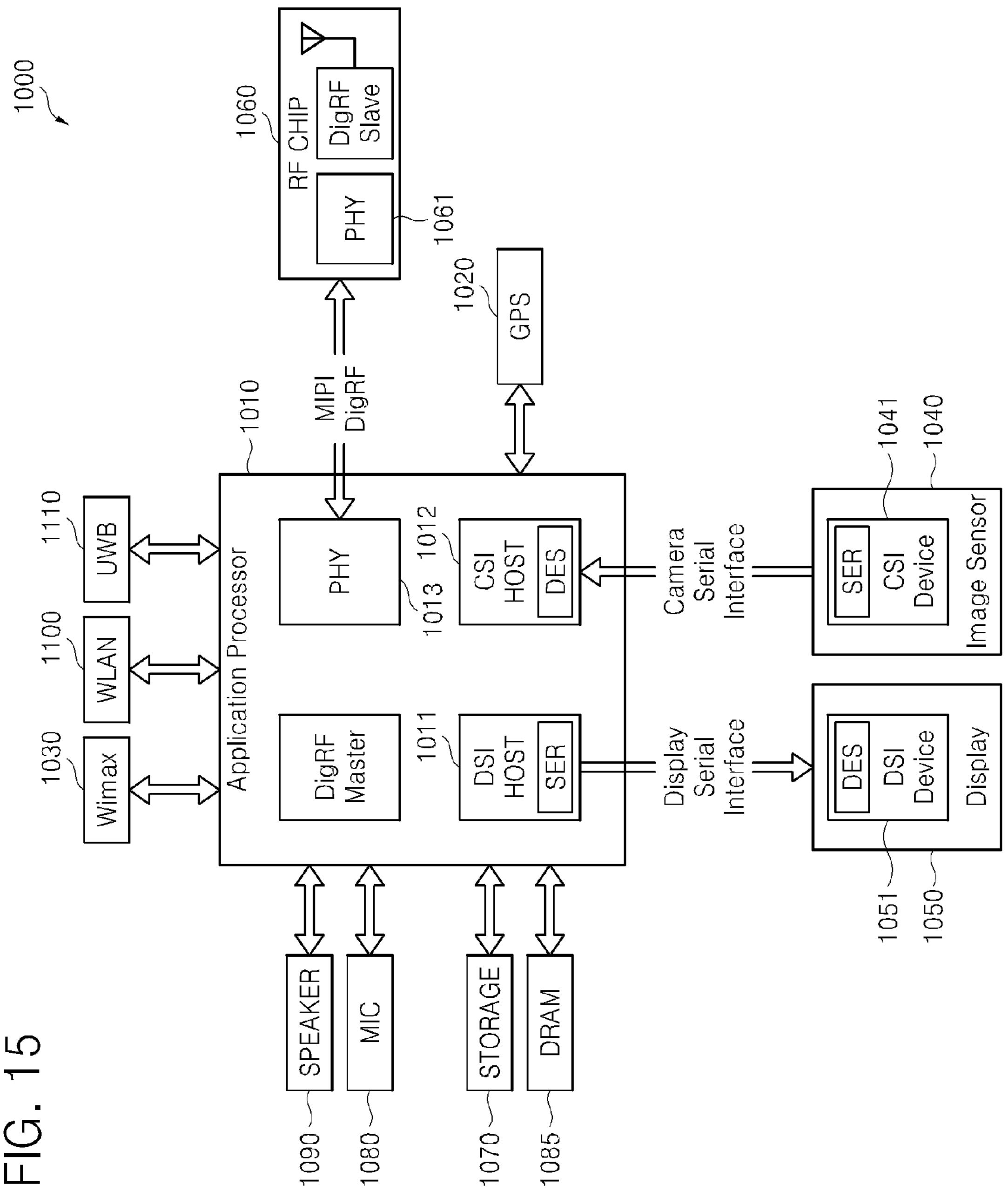
FIG. 15 is a block diagram illustrating an electronic system according to an exemplary embodiment of the present general inventive concept.

FIG. 15 is a block diagram illustrating an electronic system 1000 according to an exemplary embodiment of the present general inventive concept. Referring to FIGS. 1 and 15, the electronic system 1000 may be implemented as a data processing device, such as a PDA, a PMP, an internet protocol television (IPTV), a wearable computer, or a smart phone, which can use or support mobile industry processor interface (MIPI®). An AP 1010 may be implemented as the AP 100.

A camera serial interface (CSI) host 1012 implemented in the AP 1010 may perform serial communication with a CSI device 1041 included in an image sensor 1040 through CSI. At this time, a deserializer DES and a serializer SER may be included in the CSI host 1012 and the CSI device 1041, respectively.

A display serial interface (DSI) host 1011 implemented in the AP 1010 may perform serial communication with a DSI device 1051 included in a display 1050 through DSI. At this time, a serializer SER and a deserializer DES may be included in the DSI host 1011 and the DSI device 1051, respectively. The display 1050 may include the DDI 200 and the display panel 300, which are illustrated in FIG. 1.

The electronic system 1000 may also include a radio frequency (RF) chip 1060 communicating with the AP 1010. A physical layer (PHY) 1013 of the AP 1010 and a PHY 1061 of the RF chip 1060 may communicate data with each other according to MIPI DigRF.

The electronic system 1000 may further include a global positioning system (GPS) receiver 1020, a storage 1070, a microphone (MIC) 1080, a dynamic random access memory (DRAM) 1085, and a speaker 1090. The electronic system 1000 may communicate using a worldwide interoperability for microwave access (Wimax) module 1030, a wireless local area network (WLAN) module 1100, and an ultra-wideband (UWB) module 1110.

As described above, according to some embodiments of the present general inventive concept, part of an intermediate processing circuit is deactivated when line data is repeated or a gray pattern is detected, so that power consumption is reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of operating a display driver IC (DDI), the method comprising:

processing previous line data using an intermediate processing circuit and transmitting the processed previous line data to a data latch;

comparing the previous line data with current data to obtain a comparison result;

controlling whether to activate part of an intermediate processing circuit to process the current line data according to the comparison result; and outputting the processed previous line data as output data corresponding to the current line data when the comparison result indicates that the processed previous line data is the same as the current line data, wherein the controlling comprises:

deactivating part of the intermediate processing circuit when it is found that the previous line data is the same as the current line data as the comparison result; and activating all of the intermediate processing circuit when it is found that the previous line data is different from the current line data as the comparison result.

2. The method of claim 1, wherein deactivating part of the intermediate processing circuit comprises gating the current line data transmitted to the intermediate processing circuit.

3. The method of claim 1, wherein deactivating part of the intermediate processing circuit comprises gating a clock signal applied to the intermediate processing circuit.

4. The method of claim 1, wherein deactivating part of the intermediate processing circuit comprises controlling a power supply to the intermediate processing circuit.

5. The method of claim 1, wherein the deactivated part of the intermediate processing circuit is at least one of a pixel data processing circuit, a source shift register controller, and a data shift register.

6. The method of claim 1, wherein a pre-processing circuit, which is comprised in the intermediate processing circuit and generates information to control a back light of a display driven by the DDI, is activated even when the previous line data is the same as the current line data.

7. A display driver IC (DDI) comprising:

a storage circuit to store previous line data and current line data;

an intermediate processing circuit to process the current line data; and a line data comparing circuit to compare the previous line data with the current line data and to generate a comparison signal to control whether to activate the intermediate processing circuit according to a comparison result, wherein:

when it is found that the previous line data is the same as the current line data as the comparison result, part of the intermediate processing circuit is configured to be deactivated; and when it is found that the previous line data is different from the current line data as the comparison result, all of the intermediate processing circuit is configured to be activated.

8. The DDI of claim 7, wherein the storage circuit is a line buffer circuit that buffers the previous line data and the current line data and outputs the previous line data and the current line data to the line data comparing circuit in an overlapping time period.

9. The DDI of claim 7, further comprising a data latch to store the previous line data that has been processed by the intermediate processing circuit, wherein the data latch outputs the processed previous line data as output data corresponding to the current line data when the previous line data is the same as the current line data based on the comparison signal.

10. A display device comprising:

the DDI of claim 7; and a display panel driven by the DDI.

11. The display device of claim 10, wherein the storage circuit is a line buffer circuit that buffers the previous line data and the current line data and outputs the previous line data and the current line data to the line data comparing circuit in an overlapping time period.

12. A display system comprising:

the display device of claim 10; and an application processor to output the previous line data and the current line data to the display device.

13. The display system of claim 12, wherein the storage circuit is a line buffer circuit that buffers the previous line data and the current line data and outputs the previous line data and the current line data to the line data comparing circuit in an overlapping time period.

* * * * *